United States Patent
Tien

(10) Patent No.: US 6,752,187 B1
(45) Date of Patent: Jun. 22, 2004

(54) BICYCLE WHEEL RIM ADAPTED TO MOUNT A TUBELESS TIRE OF A LARGE SIZE

(76) Inventor: Tseng-Ping Tien, No. 20, Li Fen Rd. Hou Li Hsiang, Taichung Hsien (TW)

( * ) Notice: Subject to any disclaimer, the term of this patent is extended or adjusted under 35 U.S.C. 154(b) by 0 days.

(21) Appl. No.: 10/330,723

(22) Filed: Dec. 30, 2002

(51) Int. Cl.$^7$ .......................... B60C 21/10; B60C 17/00
(52) U.S. Cl. ............................... 152/381.4; 152/379.3; 152/516; 301/95.104
(58) Field of Search .................. 301/95.101, 95.104, 301/95.106; 152/379.3, 379.4, 379.5, 381.3, 381.4, 381.5, 381.6, 516, 520

(56) References Cited

U.S. PATENT DOCUMENTS

| | | | | |
|---|---|---|---|---|
| 1,757,728 A | * | 5/1930 | Martin | 152/381.3 |
| 2,844,180 A | * | 7/1958 | Omeron | 152/158 |
| 4,794,970 A | * | 1/1989 | Huinink et al. | 152/158 |
| 6,428,115 B1 | * | 8/2002 | Chen | 301/95.106 |
| 2003/0150538 A1 | * | 8/2003 | Ceretta | 152/158 |

* cited by examiner

Primary Examiner—Russell D. Stormer
(74) Attorney, Agent, or Firm—Harrison & Egbert

(57) ABSTRACT

A bicycle wheel rim includes two retaining portions and a locating portion. The two retaining portions are formed of a groove for retaining permanently one of two retaining edges of a tubeless tire. The locating portion is formed of two furrows, and a ridge situated between the two furrows which are located in proximity of the grooves of the retaining portions. The furrows are used as temporary dwelling places for locating the two retaining edges of the tubeless tire in the course of the mounting of the tubeless tire on the bicycle wheel rim.

1 Claim, 4 Drawing Sheets

BICYCLE WHEEL RIM ADAPTED TO MOUNT A TUBELESS TIRE OF A LARGE SIZE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a bicycle wheel rim, and more particularly to a bicycle wheel rim which is designed to mount a tubeless tire of a large size.

BACKGROUND OF THE INVENTION

The conventional bicycle wheel rim is adapted to mount a tubeless tire of small or medium size; nevertheless it is not suitable for use in mounting a tubeless tire of large size due to its lack of means to accommodate securely the tubeless tire, so as to avert the air leak.

BRIEF SUMMARY OF THE INVENTION

The primary objective of the present invention is to provide a bicycle wheel rim comprising a base, two retaining portions extending separately from the base, and a locating portion extending from the base such that the locating portion is situated between the two retaining portions. The retaining portions and the locating portion extend along the direction of a center line of the base, with the center line of the base being corresponding to a center line of the tread of a tubeless tire mounted on the bicycle wheel rim. The base is used to fasten spokes extending between the hub and the bicycle wheel rim. The two retaining portions are used to retain securely two retaining beads of a tubeless tire. The locating portion is used to facilitate the mounting of the tubeless tire.

The features and the advantages of the present invention will be more readily understood upon a thoughtful deliberation of the following detailed description of a preferred embodiment of the present invention with reference to the accompany drawings.

DETAILED DESCRIPTION OF THE INVENTION

Figure 1:
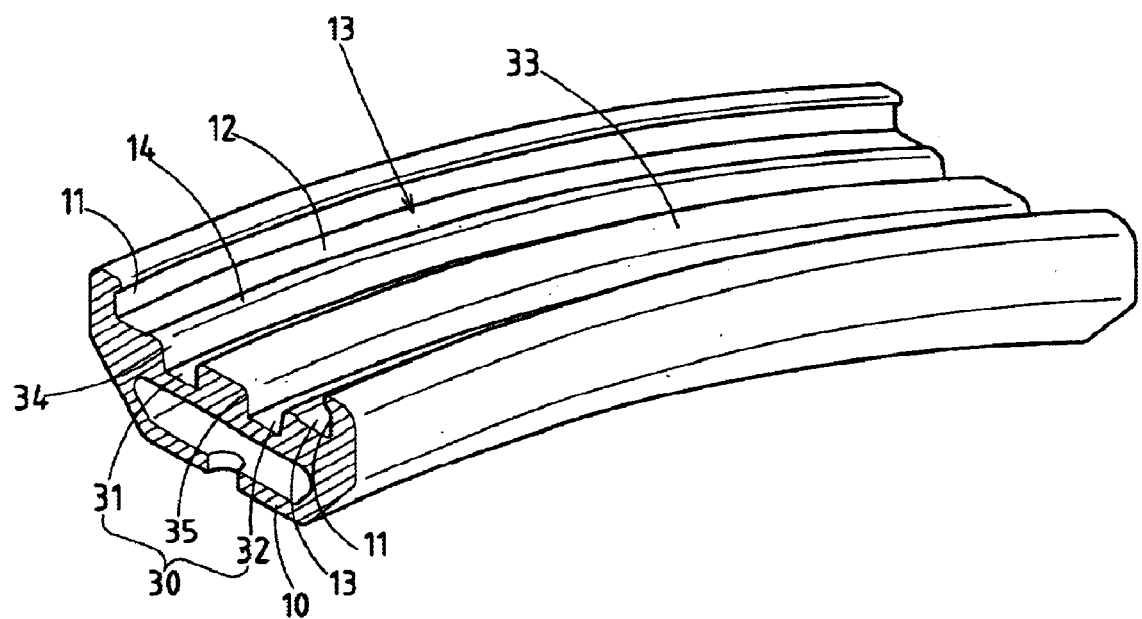
FIG. 1 shows a partial perspective view of the preferred embodiment of the present invention.
Figure 2:
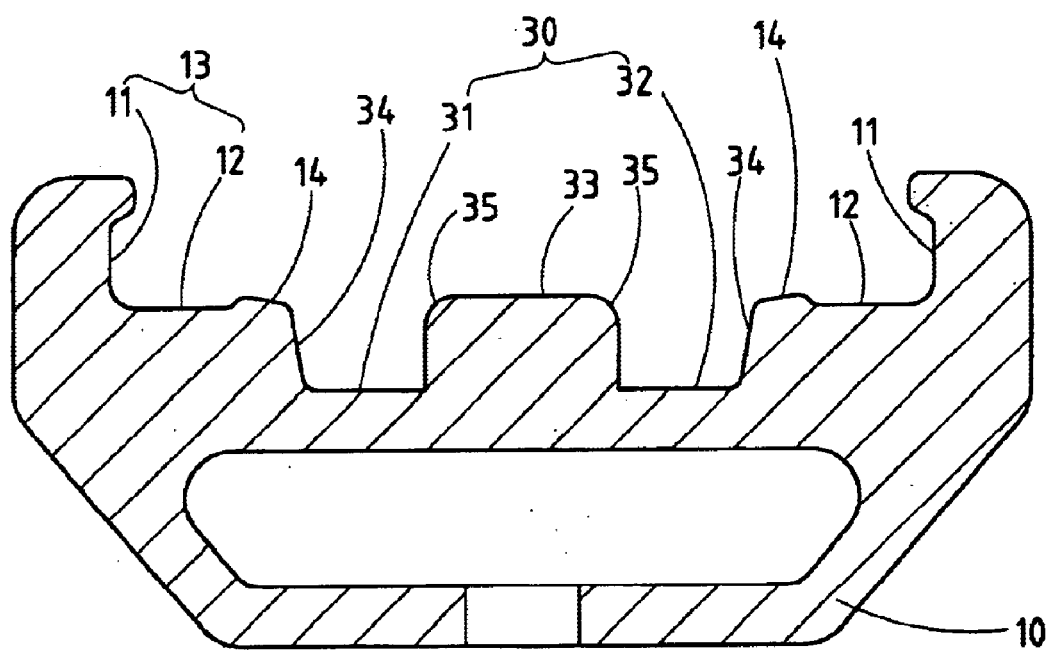
FIG. 2 shows a cross-sectional view of the preferred embodiment of the present invention.

As shown in FIGS. 1–4, a bicycle wheel rim embodied in the present invention comprises a base portion 10, two retaining portions 13, and a locating portion 30. A tubeless tire 20 is mounted on the wheel rim of the present invention in such a way that two retaining edges 21 of the tubeless tire 20 are separately retained in the two retaining portions 13 of the wheel rim.

The base portion 10 is a circular frame connected by a plurality of spokes (not shown in the drawings) to a central hub. The base portion 10 has a center line which is corresponding to a center line of the tread of the tubeless tire 20.

The two retaining portions 13 are identical in construction to each other and are made integrally with the base 10 such that they extend from two opposite fringes of an outer side of the base 10, and that they are formed of an upright flange 11 extending along the direction of the center line of the base 10, and a groove 12 having one side contiguous to the upright flange 11 and extending side by side with the upright flange 11.

The locating portion 30 is integrally made with the base 10 such that it is situated between the two retaining portions 13, and that it is extended along the direction in which the retaining portions 13 are extended. The locating portion 30 is formed of a first furrow 31, a second furrow 32, and a ridge 33 situated between the first furrow 31 and the second furrow 32. The first furrow 31, the second furrow 32, and the ridge 33 are extended along the direction in which the retaining portions 13 are extended. The first furrow 31 and the second furrow 32 are identical in construction.

Figure 3:
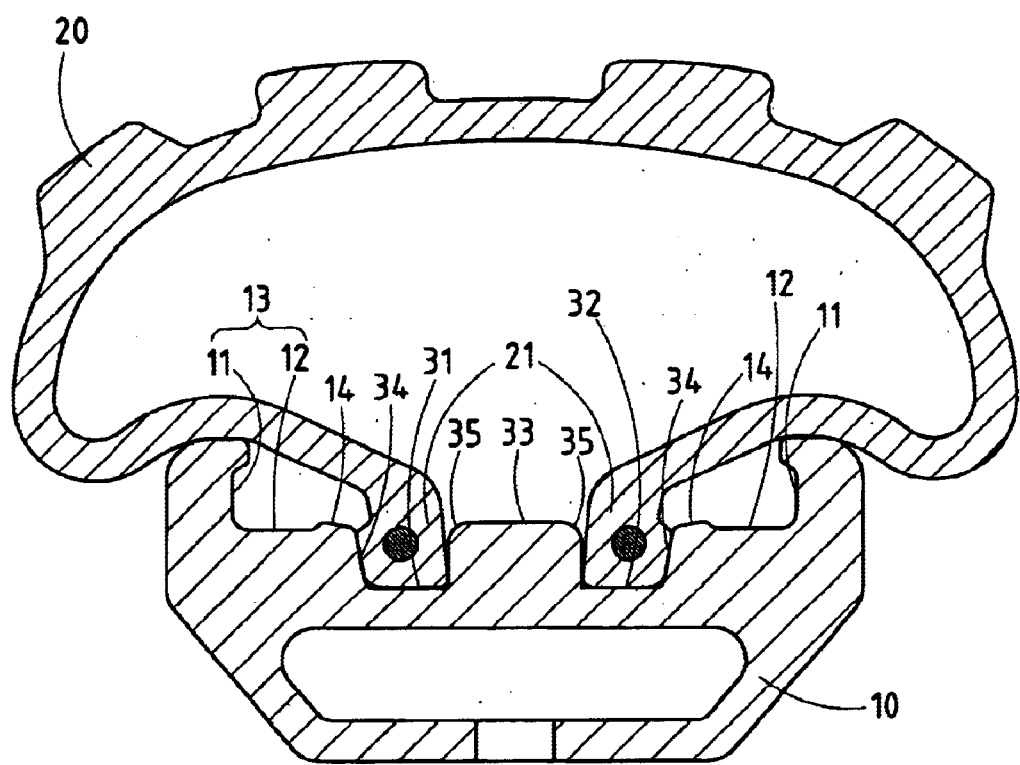
FIG. 3 shows a cross-sectional view of an initial step of the mounting of a tubeless tire on a bicycle wheel rim of the present invention.
Figure 4:
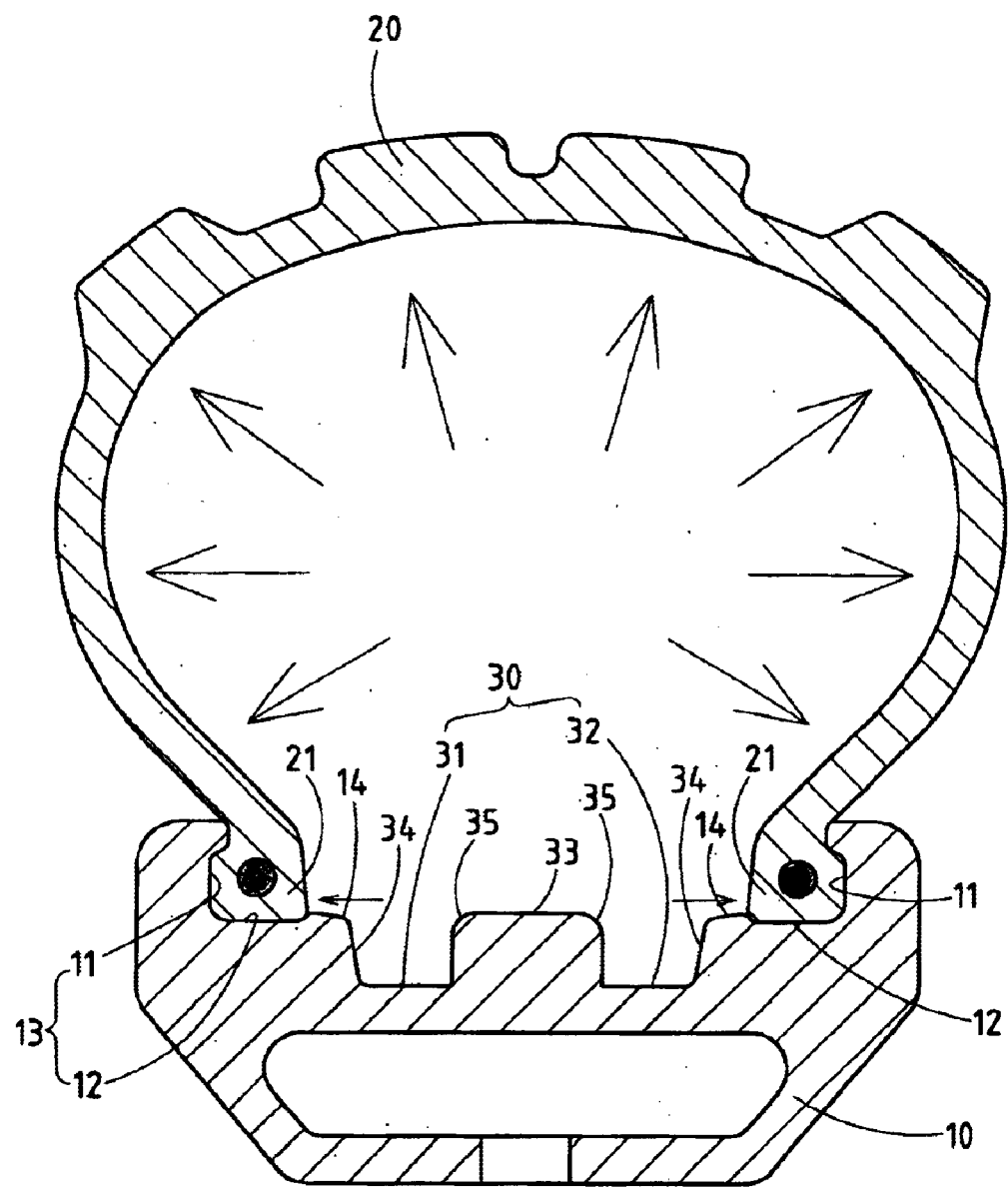
FIG. 4 shows a cross-sectional view of a final step of the mounting of the tubeless tire on the bicycle wheel rim of the present invention.

As shown in FIG. 3, two retaining beads 21 of the tubeless tire 20 are temporarily located in the first furrow 31 and the second furrow 32. As fie tubeless tire 20 is filled with the compressed air, as illustrated in FIG. 4, the tubeless tire 20 expands in such a way that the two retaining beads 21 thereof are lifted to move into the retaining portions 13, and that each retaining beads 21 is held jointly by the upright flange 11 and the groove 12 of one of the two retaining portions 13. In light of the first furrow 31 and the second furrow 32 being located in proximity of the retaining portions 13, the likelihood of air leak is minimized in the midst of migration of the retaining beads 21 of the tubeless tire 20 from the locating furrows to the retaining portions 13.

The retaining portions 13 are further formed of a raised portion 14 extending along other side of the groove 12. The raised portion 14 serves to reinforce the retaining effect of the grooves 12.

The first furrow 31 and the second furrow 32 are each provided with a slope 34 extending to the groove 12 of the retaining portions 13. The slope 34 is intended to facilitate the migrating of the retaining edges 21 of the tubeless tire 20 from the furrow to the groove.

The ridge 33 is provided along two top edges thereof with an arcuate portion 35, which is intended to prevent the retaining beads 21 of the tubeless tire 20 from being obstructed by the top edges of the ridge 33 in the course of the migration of the retaining beads 21 of the tubeless tire 20 from the furrow to the groove.

The embodiment of the present invention described above is to be regarded in all respects being illustrative and nonrestrictive. Accordingly, the present invention may be embodied in other specific forms without deviating from the spirit thereof. The present invention is therefore o be limited only by the scope of the following claims.

I claim:

1. A bicycle wheel apparatus comprising:
   a tubeless tire having a pair of retaining beads formed at an inner periphery thereof, each of said retaining beads having a generally vertical outer wall and a notch formed inwardly above said outer wall;

a circular base frame having an inner side connected by spokes to a central hub;

a pair of retaining portions formed on opposite fringes on an outer side of said base, each of said pair of retaining portions having an upright flange extending along a direction of a center line of said base, each of said pair of retaining portions having a groove positioned inwardly of said upright wall, said upright wall having an inwardly extending lip formed at an outer end of said upright wall opposite said groove, said inwardly extending lip engageable with said notch of said tire, said vertical outer wall abutting said vertical outer wall of said tire; and a locating portion extending from said outer side of said base, said locating portion positioned between said pair of retaining portions, said locating portion being formed of two furrows and ridge positioned between said two furrows, said ridge having an outer surface and a pair of sides extending respectively inwardly vertically toward said two furrows, said ridge having a pair of arcuate portions formed at an outer surface and respectively extending to said pair of sides, said two furrows and said ridge extending along the direction of the center line of said base, said two furrows respectively having an outwardly angled wall opposite said sides of said ridge, said outwardly angled wall extending to the retaining portion so as to facilitate a migration of the beads of said tire from the furrows into the respective grooves of said pair of retaining portions during a mounting of said tire onto said base frame.

* * * * *